No. 724,620. PATENTED APR. 7, 1903.
H. W. SCHMIDT.
MACHINE FOR CUTTING SUGAR CANE OR SIMILAR CROPS IN THE FIELD.
APPLICATION FILED APR. 5, 1902.
NO MODEL.
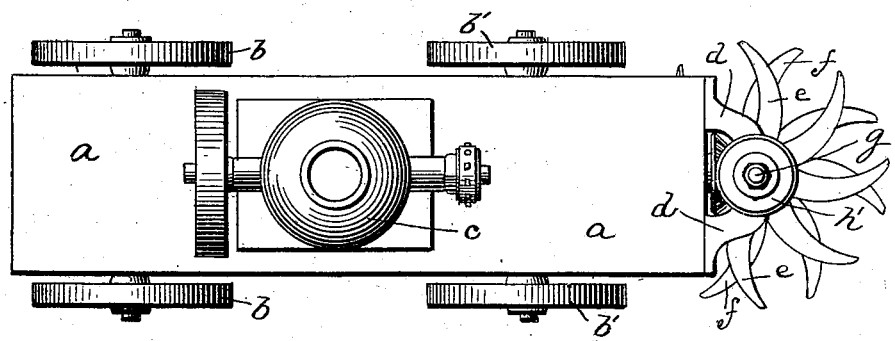
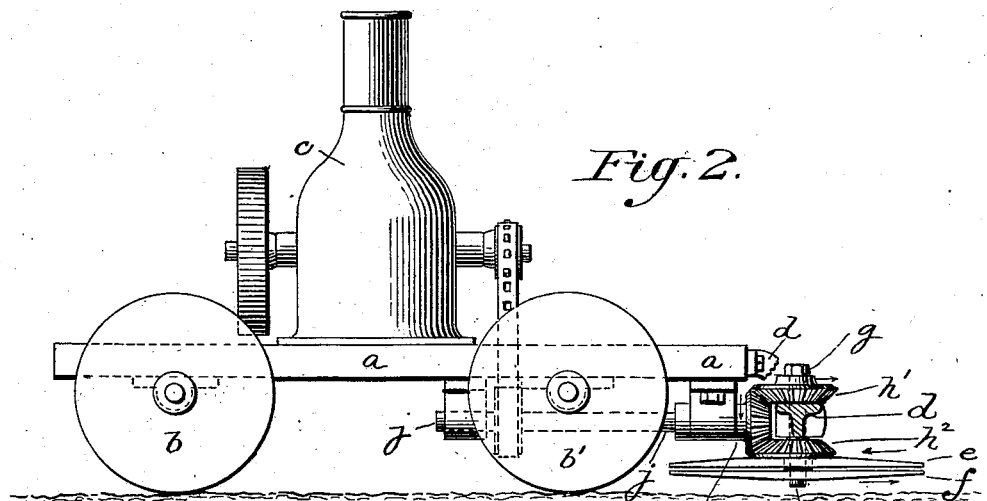
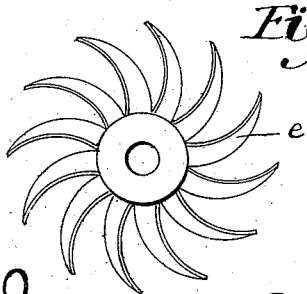

UNITED STATES PATENT OFFICE.

HENRY W. SCHMIDT, OF HONOLULU, TERRITORY OF HAWAII.

MACHINE FOR CUTTING SUGAR-CANE OR SIMILAR CROPS IN THE FIELD.

SPECIFICATION forming part of Letters Patent No. 724,620, dated April 7, 1903.

Application filed April 5, 1902. Serial No. 101,563. (No model.)

*To all whom it may concern:*

Be it known that I, HENRY WILLIAM SCHMIDT, a citizen of the United States, residing at Honolulu, Island of Oahu, Territory of Hawaii, have invented a new and useful Machine for Cutting Sugar-Cane or Similar Crops in the Field; and I hereby declare the following to be a full, clear, and exact description of the invention, such as will enable others skilled in the art to which it appertains to make and use the same.

My invention is designed principally for use in sugar-cane fields and is intended to cut the cane near the ground automatically as the machine is moved forward through the field. The old method is to cut the cane one stalk at a time by a knife in the hands of the laborer. By my invention the number of the laborers required for this work is greatly reduced.

My invention consists of the hereinafter-described machine comprising revolving disks with openings having cutting edges or revolving knives between which the cane is cut as the machine is moved forward in the field and means for revolving said cutters, all being arranged on a suitable frame mounted on wheels, as will hereinafter more fully appear.

In the accompanying drawings, Figure 1 represents a top plan view of my machine. Fig. 2 represents a side elevation of same, partly in section. Fig. 3 represents in plan one of the revolving disks with cutting edges.

Similar letters of reference indicate similar parts throughout the several views.

Referring to the drawings, it will be noted that the frame $a$ has two axles on which the wheels $b\ b'$ are free to turn. A motor $c$ is located on this frame, and a bracket $d$ is secured to the forward end of the frame. This bracket supports and forms a journal-bearing for the shaft $g$ of the revolving cutters. The lower cutter $f$ is keyed to this shaft $g$, while the upper cutter $e$ is free to turn on said shaft. The shaft $g$ has a bevel-gear $h'$, keyed to its upper end, and a similar bevel-gear $h^2$ is secured to the cutter $e$. Both of these gears mesh into and are driven by means of the bevel-gear $h^3$ on the shaft $j$, which is in turn geared or belted to the motor-shaft. It will be seen that by this construction the cutters $e$ and $f$ are caused to revolve in opposite directions. I prefer this arrangement; but any other similar method may be employed. One of the cutters may be made stationary and the other to revolve; but in this case the result would not be so satisfactory as when both revolve. The cutters may be forged and machined to shape, or separate cutting edges may be secured to a spider or hub, which latter construction permits of their being removed for sharpening or repairs.

In Figs. 1 and 2 the cutting mechanism for the sake of clearness is shown far forward of the front wheels $b'$. It is obvious that they should be as near in line as they can be and yet clear each other, so that the cutters will be kept as near as possible at a uniform distance from the ground. A gear casing or cover may be provided to protect the gears from cane and dirt.

I may employ more than one pair of cutters and mechanism for driving them, and they may be placed at an angle or parallel to one another. Either the cutters or the wheels may be made adjustable in order that the height of the cutters from the ground can be adjusted to suit the conditions of the field to be cut.

To operate the machine, the motor is started, causing the cutters to revolve, and the machine is then pushed forward along the furrow, the cutters cutting the cane near the ground.

In my opinion the best method of operating is by pushing the machine forward by a step-by-step motion instead of by a uniform motion, the length and frequency of the step depending upon the amount of cane immediately in front of the cutters.

One of the advantages of my machine is that the operation of topping and stripping the cane may be performed on the ground after it has been cut by the machine.

Having described my invention, what I claim, and desire to secure by Letters Patent, is—

In a machine for cutting sugar-cane, that is adapted to be pushed forward through the field, a bracket projecting from its front end, a vertical shaft journaled in said bracket and carrying a cutter at its lower end and a gear at its upper end, a second cutter coöperating with the first, said second cutter having a gear fixed to it and being loosely journaled on the vertical shaft, a cutter-driving motor mounted on the machine-frame, and a fore-and-aft shaft operated by the motor, said shaft having a driving-gear located between and meshing with the gears on the vertical shaft.

In testimony whereof I have signed my name to this specification in the presence of two subscribing witnesses.

H. W. SCHMIDT.

Witnesses:
  WILLIAM W. CHAMBERLAIN,
  CLARENCE H. SMITH.